United States Patent

[11] 3,558,882

[72] Inventor Adolf Mlot-Fijalkowski
 Elmwood Park, Ill.
[21] Appl. No. 788,339
[22] Filed No drawing: Dec. 31, 1968
[45] Patented Jan. 26, 1971
[73] Assignee Magnaflux Corporation
 Chicago, Ill.
 a corporation of Delaware

[54] WATER MISCIBLE PENETRANT REMOVER
 11 Claims, No Drawings
[52] U.S. Cl. .................................................. 250/71,
 73/104; 252/408
[51] Int. Cl. ........................................................ G01n 21/38
[50] Field of Search............................................ 250/71T;
 73/104; 252/408

[56] References Cited
 UNITED STATES PATENTS
 3,418,078 12/1968 Mlot-Fijalkowski et al.. 250/71X
 3,422,670 1/1969 Alburger................... 73/104

Primary Examiner—James W. Lawrence
Assistant Examiner—Davis L. Willis
Attorney—Hill, Sherman, Meroni, Gross and Simpson ABSTRACT: A liquid composition for the removal of residual films of an oil-based colored penetrant, especially a fluorescent penetrant, from the surface of a workpiece undergoing tests for surface discontinuities. The composition is effective in a 75 to 100 percent concentrated form when used in a dip, or dip and drain, or a static form of application to the residual penetrant film by dissolving or emulsifying the penetrant so that it can be flushed off with water alone. When the concentrate is diluted with water to a range of between 15 and 75 percent vigorous agitation is required, while spray applications are recommended for concentrations as low as 0.2 percent, or preferably from 0.5 to 15 percent. Spraying causes the removal of the residual penetrant as a result of impingement, turbulence and displacement. Warm or hot water is used in diluting the concentrate to bring the temperature of the diluted composition to between about 100° and 140° F., and preferably between 100° and 120° F., to facilitate the substantially complete removal of any residual film of a fluorescent penetrant, especially from rough surfaces. My composition, as a concentrate consists essentially of a liquid, water-soluble nonionic surfactant, or mixture of surfactants; a water-immiscible aromatic hydrocarbon solvent having a KB value of at least 70; and a normally liquid, water-miscible glycol-ether type of coupler. The resulting homogeneous clear liquid composition is preferably one that is infinitely miscible with water at between 40° and 140° F. without exhibiting a cloud effect within those temperature limits.

WATER MISCIBLE PENETRANT REMOVER

CROSS-REFERENCES TO RELATED APPLICATIONS

References are here made to my copending application Ser. No. 684,633, filed Nov. 21, 1967, now U.S. Pat. No. 3,543,570, and to my copending application Ser. No. 674,763, filed Oct. 12, 1967 and now abandoned. While these pending applications are somewhat related to the present application, neither of them contains any claims that conflict with the claims of the present application.

BRIEF SUMMARY OF THE INVENTION

The present invention relates to the formulation of liquid, water-miscible compositions capable of a controllable removal of oil-based, water-immiscible penetrants, and to methods for the application of such compositions by any of a number of techniques, depending upon the concentration or dilution of the composition. The effectiveness of the removal of the penetrant in each instance is controllable by varying the extent of dilution of the liquid remover concentrate with water, by controlling the turbulence during application and by applying the water diluted concentrate at various elevated temperatures up to 140° F. and higher.

The composition of my invention in its water-free form as a concentrate consists essentially of a liquid, water-soluble nonionic surfactant, or mixture of surfactants; a water-immiscible aromatic hydrocarbon solvent having a KB value of at least 70; and a normally liquid, water-miscible glycol-ether type of coupler. These constitute the nonaqueous components of my remover composition. Aqueous mixtures of the concentrate are referred to by reference to the percent of concentrate (nonaqueous components) by weight of the aqueous mixture as a whole.

Within the range of 75 to 100 percent of the nonaqueous components, my composition functions as a fast-acting emulsifier and can be applied with a minimum of agitation by a dip, dip and drain, or static technique. Depending upon the extent of water dilution, the effectiveness of the composition as a penetrant remover requires varying degrees of intensity of relative movement between the workpiece and the liquid composition. Between about 15 and 75 percent concentration (the balance being water) vigorous agitation of the workpiece or of the composition in contact therewith is required, whereas with more dilute concentrations of from about 0.5 to 15 percent nonaqueous components by weight of the water-diluted composition, vigorous spraying of the liquid composition against the residual penetrant film on the surface of the workpiece is required to exert a scouring or scrubbing or other turbulent action and a removal of the penetrant film by displacement thereof.

Since the concentrated form of my composition is capable of infinite dilution with water, as well as having a high degree of tolerance toward the oily penetrant that remains as a film on the workpiece, my composition lends itself to all of these various techniques for cleaning the surfaces of the workpieces contaminated with residual films of a water-immiscible penetrant, and especially of a fluorescent penetrant in which the major portion of the liquid penetrant vehicle is an aromatic hydrocarbon, so as to leave the surfaces substantially free of any residual fluorescence that would interfere with the fidelity of the results obtained by visual inspection of the color indications under filtered ultraviolet, or "black" light.

Where spraying or other high kinetic energy form of application is used, a relatively large volume of the diluted concentrate containing between about 0.5 and 15 percent concentrate, is used. Consequently, since so little of the solute, namely, the nonaqueous components, is involved, the use of the remover is recommended on an expendable basis and the remover is not recovered for reuse. However, where relatively concentrated forms of the composition are employed, varying from about 15 percent up to about 100 percent of the concentrate, the remover composition, because of its high tolerance toward the penetrant, can be more economically recovered and reused repeatedly on a recirculative basis.

Dilution of the concentrate can best be accomplished by injecting a controlled amount of the concentrate into a stream of water at the required elevated temperature and in proper proportions to give the desired degree of dilution and the proper temperature of the liquid remover when applied to the surface of the workpiece for most effective removal of the excess of penetrant film on the surface without removal of penetrant entrapped in any surface flaws or other surface discontinuities. Where relatively high concentrations are desired, the concentrate is added to a measured quantity of water and mixing effected to obtain a homogeneous clear liquid. The extent of dilution is also controlled by varying the composition as to its several components within the ranges of percentages for such components hereinafter set forth.

DETAILED DESCRIPTION

The nonaqueous portion of my composition comprises at least one nonionic surfactant that may normally be in liquid, paste or solid form but that in combination with a coupler is completely miscible with the other components of my composition; a water-immiscible liquid aromatic hydrocarbon (referred to herein as an aromatic hydrocarbon solvent) having a Kauri Butanol (KB) value expressed in cubic centimeters of at least about 70; and a normally liquid, water-miscible glycol-type coupler selected from any of a large number of glycol-type ethers that are known for their effectiveness as mutual solvents and couplers.

Suitable nonionic surfactants include alkylphenoxy polyethoxylated ethanols, in which the alkyl radical is usually a $C_8$-$C_{12}$ group, preferably an octyl or nonyl radical and in which the alkylphenoxy polyethoxylated ethanol contains from about 6 to 30, or more, ethylene oxide groups per molecule. If two or more such surfactants are used, one of them preferably contains about 9.5 ethylene oxide groups and the other or others contain about 12 to 30 groups of ethylene oxide groups. A single surfactant can be selected for use in my composition, or two or more surfactants can be used together in any proportions, provided the total content of surfactant is within the ranges specified below.

Another type of nonionic surfactant that has been found suitable is the group of liquid, water-miscible, polyethoxylated straight chain primary $C_{12}$-$C_{15}$ alcohols containing from 6.5 to 15.5 ethylene oxide groups per molecule of alcohol.

Low foaming, biodegradable, nonionic surfactants are also satisfactory for use in my remover composition. These are primary alcohol-ethylene oxide adducts which have been modified to reduce foaming. They are essentially clear liquids having low freezing points; having cloud points, 1 percent aqueous, of approximately 35° to 50° C.; surface tension, 25° C., of around 33 to 34 dynes/cm. at 0.1 percent concentration; and of around 37 to 38 dynes/cm. at 0.001 percent concentration; and a degree of biodegradability equivalent to about 5 to 12 percent of surfactant remaining after 7 days, as determined by the Shake Flask Method.

Still another, but less suitable group of nonionic surfactants is the polyethoxylated lauroylamides containing from 5 to 15 ethylene oxide groups per molecule.

With respect to the water-immiscible aromatic hydrocarbon solvent used, one having a KB value of about 70 is preferred but solvents having higher KB values, up to 120 or higher are suitable for use provided the aromatic hydrocarbon solvents are properly balanced with respect to the other components of the composition to give a clear, homogeneous liquid and are within the ranges given below. An aromatic hydrocarbon solvent available on the market that is said to be 80 percent aromatic and that has a KB of 70 and a flash point (Tag Closed Cup, TCC) of 135° C. has been found eminently suitable for my composition.

Any glyco-ether coupler selected from the following list can be used:

Glycol-ethers available from Union Carbide Corp. Chemicals Division, New York, identified by their proprietary names and chemical formulas as follows:

Methyl cellosolve____ $CH_3OCH_2CH_2OH$
Cellosolve solvent____ $C_2H_5OCH_2CH_2OH$
Butyl cellosolve_____ $C_4H_9OCH_2CH_2OH$

| | |
|---|---|
| Isobutyl cellosolve | $(CH_3)_2C_2H_3OC_2H_4OH$ |
| Methyl carbitol | $CH_3OCH_2CH_2OCH_2CH_2OH$ |
| Carbitol solvent | $C_2H_5OCH_2CH_2OCH_2CH_2OH$ |
| Carbitol solvent low. grav. | $C_2H_5OCH_2CH_2OCH_2CH_3OH$ |
| Butyl carbitol | $C_4H_9OCH_2CH_2OCH_2CH_2OH$ |
| Hexyl carbitol | $C_6H_{13}OCH_2CH_2OCH_2CH_2OH$ |
| Ucar solvent LM | $CH_3OCH_2CH(CH_3)OH$ |
| Ucar solvent 2LM | $CH_3OCH_2CH(CH_3)OCH_2CH(CH_3)OH$ |
| Methoxytriglycol | $CH_3OCH_2CH_2OCH_2CH_2OCH_2CH_2OH$ |
| Ethoxytriglycol | $C_2H_5OCH_2CH_3OCH_2CH_2OCH_2CH_2OH$ |
| Butoxytriglycol | $C_4H_9OCH_2CH_2OCH_2CH_2OCH_2CH_2OH$ |
| 1-butoxyethoxy-2-propanol. | $C_4H_9OCH_2CH_2OCH_2CH(CH_3)OH$ |

In place of any of the above-named glycol-ethers, a liquid water-miscible glycol-ester, e.g. methyl Cellosolve acetate or AMF. 12-23-68 Carbitol acetate can be used.

Glycol-ethers a that are particularly preferred are ethylene- or diethylene glycol monobutyl ethers, known by their proprietary names as "Butyl Carbitol" and "Butyl cellosolve." The glycol-ethers are used within the limits given below. Where aromatic hydrocarbons of higher KB values of about 70 to 80 are employed, larger percentages of the glycol-ethers are used, and the same holds true where higher percentages of surfactants are used, within their respective ranges as given below.

The percentage ranges, both broad and narrow, and the preferred percentages for the various components of my composition as a concentrate, are as follows, expressed in percent by weight:

FORMULA NO. 1.—CONCENTRATE (100% NON-AQUEOUS)

| Component | Broad range, percent | Narrow range, percent | Preferred, percent |
|---|---|---|---|
| Surfactant | 5-85 | 20-50 | 43 |
| Aromatic hydrocarbon solvent | 5-20 | 12-18 | 15 |
| Glycol-type coupler | 15-90 | 30-50 | 42 |

If desired, a trace of red dye or other visible dye may be added to give an identifying color for the composition, but the composition should include no fluorescent dye nor any dye in such concentration that it would give a background color tending to mask the color indications that are developed at any surface discontinuities in the workpiece.

Although a single surfactant can be used, there is some advantage in using two surfactants, such as one alkylphenoxy polyethoxylated ethanol containing 9.5 ethylene oxide groups per molecule and a second alkylphenoxy polyethylene ethanol containing 12 ethylene oxide groups per molecule. The first-named compound has better removing action toward the residual oily penetrant film, probably because of greater dissolving power toward oils; and the second-names compound has higher tolerance toward oily penetrants when in the presence of water or when the penetrant is contaminated with water. Where two or more surfactants are used, their respective proportions can be varied greatly so long as the total percentage of surfactant is within the broad range, or more preferably within the narrow range, given above. For the preferred composition of the concentrate, I have used 21 percent of a nonylphenoxy poly (12) ethoxyethanol and 22 percent of a nonylphenoxy poly (9.5) ethoxyethanol, the figures in parentheses indicating the number of ethylene oxide groups per molecule, 42 percent of diethylene glycol monobutyl ether and 15 percent of the aromatic hydrocarbon solvent. The figures given in parenthesis are the averages within narrow ranges for the number of ethylene oxide groups per molecule, the extremes of the range within which the number such as 9.5 is specified being probably not more than 1 or 2 either way of that number.

The aromatic hydrocarbon solvent exerts a solvating action upon the residual penetrant which is also often aromatic in character. Without the aromatic hydrocarbon solvent present in my composition, the removal of the excess penetrant is slowed down, especially with the dip method, and in some instances the liquid remover tends to pull away from the film of penetrant, a phenomenon that is the opposite of a wetting action, and that makes removal of the penetrant film difficult because of lack of ability of the remover to emulsify the film or diffuse into it. Too much of the aromatic hydrocarbon solvent, i.e., above about 20 percent of the concentrate, decreases the penetrant tolerance and the thoroughness of the removal of the fluorescent penetrant film, thereby tending to leave background fluorescence on the surface of the workpiece.

The glycol-ether serves as a typical coupling agent maintaining the homogeneity of the water-diluted concentrate, whether incidentally contaminated with water when the concentrate is used, or prediluted with water for the intended mode of application.

If the percentage of the glycol-ether type of coupler is less than about 15 percent of the total weight of concentrate, the concentrate AMF. 12-23-68 tends to gel upon the addition of water. The gel formed is so hard and stiff that the remover cannot be sprayed or otherwise applied satisfactorily.

Where ferrous metal containers are used in the penetrant system, corrosion inhibitors are added and a sufficient quantity of water incorporated into the liquid remover composition to dissolve the inhibitors. If a composition of about 33 percent of concentrate, 66 percent of water were desired, 200 parts of water containing 1.6 parts each of sodium nitrite and sodium chromate, would be mixed with the 100 parts of concentrate, parts being by weight. Any other suitable rust inhibitors could be used in place of the sodium nitrite and sodium chromate and in varying proportions to give effective corrosion inhibition.

The penetrant method, as is well known, includes applying a colored oily penetrant to the surface of the workpiece undergoing test; allowing sufficient dwell time for the penetrant to penetrate into any surface flaws; removing the excess of penetrant from the surface without substantial removal of the flaw-entrapped penetrant; and then developing a color indication with either a dry developer or a wet developer, aqueous or nonaqueous, with or without an intermediate drying of the surface; and finally inspecting the surface for developed color indications under suitable conditions such as under "black" light where a fluorescent penetrant is used. The improvement in the penetrant method that is here involved, resides in the use of the liquid remover composition of my invention for the removal of the residual excess of fluorescent penetrant left on the surface of the workpiece, as for instance after draining off such of the liquid penetrant as can be readily drained off, or such as can be removed by wiping the surface with an absorbent cloth or other material.

The application of my liquid remover composition can be accomplished at any state of dilution, above about 0.2 percent, or at any state of concentration, up to 100 percent, depending upon the mode or techniques used, all as explained above. The water-diluted remover compositions of my invention are those that lend themselves to commercial penetrant inspection methods because such compositions are economic in that they are expendable and require no recovery system for reuse of the compositions. However, my composition may be sold as a concentrate for dilution at the point of use. My remover composition therefore has such flexibility, as a result of ready controllability in its formulation, its degree of dilution and in its usefulness at high temperatures, as to make the product universal. The removal of excess penetrant from a porous surface, such as that of a casting, is facilitated by application of my remover in its water-diluted state at an elevated temperature, such as from 100° F. on up.

As indicative of suitable specific compositions of the diluted remover of my intention the following are given:

FORMULA NO. 2

| Surfactants | Concentrate | | |
|---|---|---|---|
| | 100% | 0.2% | 5% |
| Nonylphenoxy poly(15)ethoxy ethanol | 18 | 0.036 | 0.90 |
| Nonylphenoxy poly(9.5)ethoxy ethanol | 25 | 0.050 | 1.2 |
| Aromatic hydrocarbon solvent, KB of 70 or higher | 15 | 0.030 | 0.75 |
| Diethylene glycol monobutyl ether | 42 | 0.084 | 2.10 |
| Water | | 99.800 | 95.00 |

FORMULA NO. 3

| Surfactants | Concentrate | | |
|---|---|---|---|
| | 100% | 5% | 0.2% |
| $C_{12}$-$C_{15}$ alcohol 7EO * ethoxylate | 22 | 1.10 | 0.044 |
| $C_{12}$-$C_{15}$ 15EO ethoxylate | 21 | 1.05 | 0.042 |
| Diethylene glycol monobutyl ether | 42 | 2.10 | 0.084 |
| Aromatic hydrocarbon solvent | 15 | 0.75 | 0.030 |
| Water | | 95.00 | 99.800 |

*EO stands for ethylene oxide groups.

FORMULA NO. 4.—RANGE

| | Concentration | | | |
|---|---|---|---|---|
| | 100% | 15% | 50% | 75% |
| Nonylphenoxy poly(12)ethoxylated ethanol | 43 | 6.5 | 21.5 | 32.25 |
| Diethylene glycol monobutylether | 42 | 6.1 | 21.0 | 31.5 |
| Aromatic hydrocarbon solvent, 70KB | 15 | 2.2 | 7.5 | 11.25 |
| Water | | 85.2 | 50.0 | 25.0 |

FORMULA NO. 5     100% Concentrate
$C_{12}$-$C_{15}$ alcohol 12 EO ------------------------- 21
Lauroyl 5 EO amide -------------------------- 22
Aromatic hydrocarbon solvent, 70KB ----------- 15
Diethylene glycol monobutyl ether ------------- 42
Water FORMULA NO. 6     100% concentrate
Lauroyl 5 EO amide -------------------------- 43
Aromatic hydrocarbon solvent ----------------- 15
Diethylene glycol monobuty ether ------------- 42
Water In the foregoing formulas wherever an aromatic hydrocarbon solvent is specified, any aromatic hydrocarbon solvent having a KB value of 70 or over can be substituted in the same amounts as specified. The following data, however, indicate aromatic solvents of desirable properties:

| | KB value | Aromatic content |
|---|---|---|
| A | 103.7 | 99.3 |
| B | 112.0 | 80.0 |
| C | 70.0 | 80.0 |
| D | 72.0 | 72.0 |

The composition of the aromatic solvent designated as A in the above list is believed to be the following:

| | Percent vol. |
|---|---|
| $C_9$-$C_{15}$ alkylbenzenes | 3.2 |
| Naphthalene | 4.4 |
| $C_{11}$-$C_{15}$ substituted naphthalenes | 82.6 |
| $C_9$-$C_{14}$ naphthene and dinaphthene benzenes | 6.6 |
| $C_{12}$-$C_{16}$ acenaphthenes | 3.2 |
| Total | 100.0 |

An aromatic solvent such as the foregoing and other water-immiscible aromatic hydrocarbons of at least about 70 KB value function as a solvent for the penetrant where the penetrant is completely immiscible in water. In a dilute concentration, e.g. of 0.5 percent, the aromatic hydrocarbon solvent is probably present as the interior or dispersed phase of a colloidal system in which the aqueous surfactant solution is the continuous phase. Being the interior phase, the aromatic hydrocarbon solvent exerts no more solvent action upon the penetrant, in the absence of turbulence, than does the aqueous surfactant. Both the aromatic hydrocarbon and the dilute aqueous surfactant solution have surface tensions of around 32—34 dynes per centimeter, and set up interfacial tensions with the penetrant of around 13—14 dynes per centimeter, which are far too high for spontaneous emulsification. Thus, in the absence of turbulence there is too high a surface energy barrier to permit any interaction between the penetrant and the water diluted remover. This explains why turbulence is required where dilute solutions are used as the remover.

On the exposed surfaces of the workpiece, however, both the aqueous surfactant solution and the aromatic hydrocarbon components of the remover function, when the composition is applied forcefully, to remove the superficial residual penetrant. It is the dynamic, physical force of the liquid remover that loosens up and displaces the penetrant film. The surface active agent serves to prevent redeposition of the penetrant by causing the liquid remover to wet the surface preferentially as regards the penetrant and serves to keep the turbulently formed droplets of the penetrant small. In combination, the surfactant and aromatic hydrocarbon solvent function to remove the surface penetrant in a highly efficient manner, not possible by the use of only the surfactant or only the aromatic hydrocarbon solvent.

I claim:

1. A liquid, water-miscible composition for removal of an excess of an oily type of penetrant from the surface of a workpiece,
   said composition as a concentrate consisting essentially of:
   at least one liquid, water-miscible nonionic surfactant, a water-immiscible aromatic hydrocarbon solvent having a KB value of at least about 70; and
   a normally liquid, water-miscible glycol-type coupler;
   said concentrate in an undiluted state having an emulsifying action toward an oily type of penetrant when in substantially static contact therewith; and
   said concentrate in a water solution in percentages by weight as low as 0.2 percent of concentrate when applied kinetically to said excess penetrant being capable of effecting the removal of said excess penetrant by impingement, turbulence and displacement.

2. A composition as defined by claim 1, wherein:
   said surfactant is selected from the group consisting of: alkylphenoxy polyethoxylated ethanols, polyethoxylated straight chain primary $C_{12}$-$C_{15}$ 12-C$_1$5 alcohols containing from 6.5 to 15.5 ethylene oxide groups per molecule, polyethoxylated lauroyl amides containing from 5 to 15 ethylene oxide groups per molecule, biodegradable alcohol-ethylene oxide adducts and mixtures thereof, and is present within the range of about 5 to 85 percent, said aromatic hydrocarbon solvent is present within the range of about 5 to 20 percent, and
   said glycol type of coupler is an alkylene glycol-ether and is present within the range of about 15 to 90 percent, all percentages being by weight of the total nonaqueous portion of the composition.

3. A composition as defined by claim 2, wherein there are two surfactants, one having about 9.5 ethylene oxide groups and the other having about 15 ethylene oxide groups per molecule of alkylphenoxy polyethoxylated ethanol and the total of said surfactants is within the range of about 20 to 50 percent.

4. A composition as defined by claim 2, wherein:
   the surfactant content is within the range of from 20 to 50 percent;
   the aromatic hydrocarbon solvent is present within the range of from 12 to 18;
   the glycol-ether is present within the range of from 30 to 50 percent; and
   said composition being a clear homogeneous liquid having infinite miscibility with water at temperatures between 100° and 140° F. without cloud formation.

5. A composition as defined by claim 2, wherein:
   said components are indicated and present in substantially the following percentages:
   18 percent of an alkylphenoxy polyethoxylated ethanol having about 15 ethylene oxide groups per molecule;

25 percent of an alkylphenoxy polyethoxylated ethanol having about 9.5 ethylene oxide groups per molecule;

15 percent of an aromatic hydrocarbon solvent having a KB value of about 70; and 42 percent of an ethylene glycol monobutyl ether;

said composition having good penetrant-removing capability when diluted with water to the concentrations indicated below and used in accordance with the indicated techniques:

from 0.2 to 15 percent concentration when used as a vigorously turbulent spray against the workpiece;

from 15 to 75 percent concentration when used as a dip with agitation relative to the workpiece; and from 75 to 100 percent concentration when used as a dip without agitation.

6. In the method of detecting surface discontinuities in a workpiece by the liquid penetrant technique in which an oily-type liquid penetrant is applied to the surface of the workpiece, the excess of penetrant is removed from said surface without substantial removal of the penetrant residue entrapped in any surface discontinuity and said surface is thereafter inspected under conditions suitable for revealing the presence of surface discontinuities, the improvement which comprises:

removing said excess of penetrant by the application to said surface of a composition which, as a concentrate, consists essentially of:

at least one liquid, water-miscible, nonionic surfactant;

a water-immiscible aromatic hydrocarbon solvent having a KB value of at least about 70; and a normally liquid, water-miscible glycol-type coupler; and establishing substantially static contact between said concentrate and said excess of penetrant to effect a sufficient emulsification of said penetrant to facilitate removal of said excess of penetrant.

7. In a method of detecting surface discontinuities in a workpiece by the liquid penetrant technique in which an oily-type liquid penetrant is applied to the surface of the workpiece, the excess of penetrant is removed from said surface without substantial removal of the penetrant residue entrapped in any surface discontinuity and said surface is thereafter inspected under conditions suitable for revealing the presence of surface discontinuities, the improvement which comprises:

removing said excess of penetrant by the application to said surface of a water solution of from 0.2 percent to 15 percent by weight of a concentrate;

said concentrate consisting essentially of:

at least one liquid, water-miscible nonionic surfactant;

a water-miscible aromatic hydrocarbon solvent having a KB value of at least 70; and a normally liquid, water-miscible glycol-type coupler; and said water solution being applied kinetically to said excess penetrant to effect the removal thereof by impingement, turbulence and displacement.

8. A method as defined by claim 6, in which said nonionic surfactant is selected from the group consisting of alkylphenoxy polyethoxylated ethanols, polyethoxylated straight chain primary $C_{12}$-$C_{15}$ alcohols containing from 6.5 to 15.5 ethylene oxide groups per molecule, polyethoxylated lauroyl amides containing from 5 to 15 ethylene oxide groups per molecule, biodegradable alcohol-ethylene oxide adducts and mixtures thereof, and is present within the range of about 5 to 85 percent said aromatic hydrocarbon solvent is present within the range of about 5 to 20 percent and said glycol-type of coupler is an alkylene glycol-ether and is present within the range of about 15 to 90 percent all percentages being by weight of the total nonaqueous portion of the composition.

9. In a method of detecting surface discontinuities in a workpiece by the liquid penetrant technique in which an oily-type liquid penetrant is applied to the surface of the workpiece, the excess of penetrant is removed from said surface without substantial removal of the penetrant residue entrapped in any surface discontinuity and said surface is thereafter inspected under conditions suitable for revealing the presence of surface discontinuities, the improvement which comprises:

removing said excess of penetrant by the application to said surface of a composition, which consists essentially of:

at least two liquid, water-miscible m nonionic surfactants, one having about 9.5 ethylene oxide groups and the other having about 15 ethylene oxide groups per molecule of alkylphenoxy polyethoxylated ethanol and the total of said surfactants is within the range of about 20 to 50 percent;

a water-immiscible aromatic hydrocarbon solvent having a KB value of at least about 70; and a normally liquid, water-miscible glycol-type coupler.

10. In a method of detecting surface discontinuities in a workpiece by the liquid penetrant technique in which an oily-type liquid penetrant is applied to the surface of the workpiece, the excess of penetrant is removed from said surface without substantial removal of the penetrant residue entrapped in any surface discontinuity and said surface is thereafter inspected under conditions suitable for revealing the presence of surface discontinuities, the improvement which comprises:

removing said excess of penetrant by the application to said surface of a composition consisting essentially of:

at least one liquid, water-miscible nonionic surfactant selected from the group consisting of alkylphenoxy polyethoxylated ethanols, polyethoxylated straight chain primary $C_{12}$-$C_{15}$ alcohols containing from 6.5 to 15.5 ethylene oxide groups per molecule, polyethoxylated lauroyl amides containing from 5 to 15 ethylene oxide groups per molecule, biodegradable alcohol-ethylene oxide adducts and mixtures thereof, the selected surfactant being within the range of from 20 to 50 percent by weight of said composition;

a water-immiscible aromatic hydrocarbon solvent having a KB value of at least about 70 present within the range of from 12 to 18 percent by weight of said composition; and a normally liquid, water-miscible glycol-ether as the coupler, present within the range of from 30 to 50 percent by weight of said composition, said composition being a clear homogeneous liquid having infinite miscibility with water at temperatures between 100° and 140° F. without cloud formation.

11. In the method of detecting surface discontinuities in a workpiece by the liquid penetrant technique in which an oily-type liquid penetrant is applied to the surface of the workpiece, the excess of penetrant is removed from said surface without substantial removal of the penetrant residue entrapped in any surface discontinuity and said surface is thereafter inspected under conditions suitable for revealing the presence of surface discontinuities, the improvement which comprises:

spraying against said surface an aqueous solution containing from 0.2 to 15 percent of a concentrate consisting essentially of:

a surfactant selected from the group consisting of: alkylphenoxy polyethoxylated ethanols, polyethoxylated straight chain primary $C_{12}$-$C_{15}$ alcohols containing from 6.5 to 15.5 ethylene oxide groups per molecule, polyethoxylated lauroyl amides containing from 5 to 15 ethylene oxide groups per molecule, biodegradable alcohol-ethylene oxide adducts and mixtures thereof, the selected surfactant being present within the range of about 5 to 85 percent by weight of said concentrate;

a water-immiscible aromatic hydrocarbon solvent having a KB value of at least 70 present within the range of about 5 to 20 percent by weight of said concentrate;

an alkylene glycol-ether type coupler present within the range of about 15 to 90 percent by weight of said concentrate;

the balance of said composition being substantially water; and said aqueous solution being sprayed at a temperature between about 100° F. and 140° F.